United States Patent [19]

Sugishima

[11] Patent Number: 4,887,209

[45] Date of Patent: Dec. 12, 1989

[54] ELECTRONIC CASH REGISTER SYSTEM

[75] Inventor: Yasuo Sugishima, Soraku, Japan

[73] Assignee: Sharp Kabushiki Kaisha, Osaka, Japan

[21] Appl. No.: 117,829

[22] Filed: Nov. 9, 1987

[30] Foreign Application Priority Data

Nov. 11, 1986 [JP] Japan .................. 61-173528
Oct. 26, 1987 [JP] Japan .................. 62-271236

[51] Int. Cl.$^4$ .................................. G07G 1/12
[52] U.S. Cl. ........................................ 364/405
[58] Field of Search .......... 364/405, 404, 900 MS File

[56] References Cited

U.S. PATENT DOCUMENTS

| | | | |
|---|---|---|---|
| 4,302,010 | 11/1981 | Kaenel | 364/411 X |
| 4,348,551 | 9/1982 | Nakatani | 364/405 |
| 4,412,304 | 10/1983 | Yamakita | 364/405 X |
| 4,502,120 | 2/1985 | Ohnishi | 364/405 |
| 4,751,641 | 6/1988 | Collins | 364/405 |
| 4,771,382 | 9/1988 | Shiono et al. | 364/405 |
| 4,791,417 | 12/1988 | Bobak | 340/784 |
| 4,825,045 | 4/1989 | Humble | 364/405 X |

FOREIGN PATENT DOCUMENTS 5576801 2/1982 Japan .
85/02151 6/1986 World Int. Prop. O. .

*Primary Examiner*—Jerry Smith
*Assistant Examiner*—Steven G. Kibby
*Attorney, Agent, or Firm*—Birch, Stewart, Kolasch & Birch

[57] ABSTRACT

An electronic cash register system has an electronic cash register which acts as a master machine and a plurality of electronic cash registers which act as slave machines. The master machine includes a processor for processing of a variety of data. This data is collected by a reading device which reads written character or graphics data. The read data is then stored in a storage device. The master machine further includes a panel display device for displaying the data stored in the storage device. The master machine control the panel display device and the transferring of data to the slave machine. Each slave machine includes a storage device, a display panel, and controller for carrying out its operations.

6 Claims, 8 Drawing Sheets

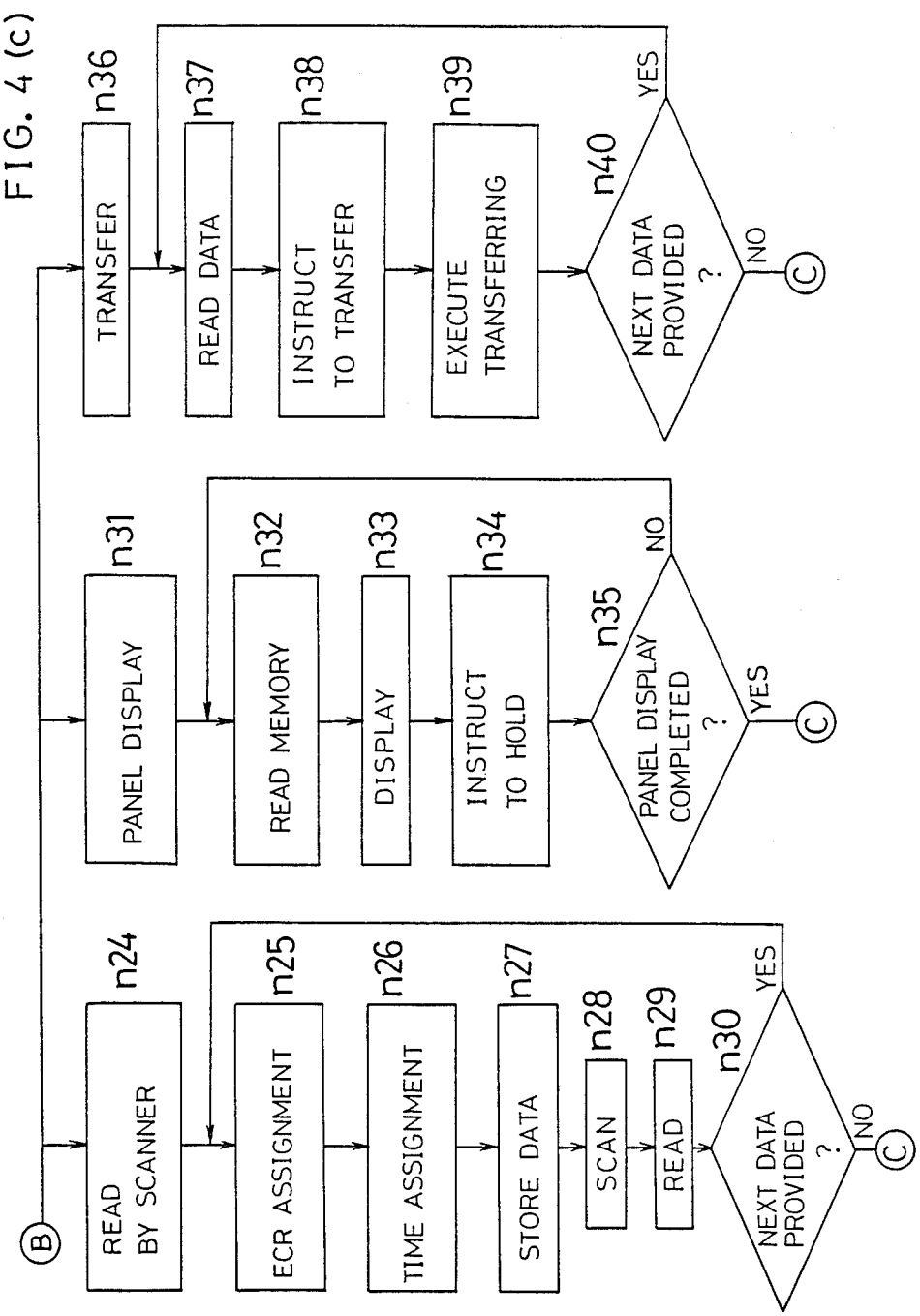

ELECTRONIC CASH REGISTER SYSTEM

FIELD OF THE INVENTION AND RELATED ART STATEMENT

This invention relates to an electronic cash register system for processing a variety of transaction data, more particularly, to an inter-register communication system (inline system).

In a conventional electronic cash register which processes a variety of transaction data, service information for customers, which is displayed by a display device of the electronic cash register, is created by manually inputting a display bit pattern of the information.

In this conventional apparatus, the contents that can be displayed by the display device are limited to, for example, character information in which a predetermined character pattern is arranged. Therefore, there has been a desire for an electronic cash register on which more complicated characters and graphics can be displayed.

The present invention is directed to an electronic cash register which overcomes the aforementioned technical problems, and in which a variety of characters and graphics can be displayed by a display means thereof. However, since there are large numbers of electronic cash registers installed in large-scale stores, such as a department store, if the operation of inputting information is conducted individually for each electronic cash register, the workload will become heavy.

An objective of the present invention is to provide an electronic cash register system which consists of a master machine and slave machines, and which is characterized in that the aforementioned problems can be overcome, and the workload be significantly reduced, thereby utiliting data more efficiently because the structure in which the inputting of data relating to a variety of characters and graphics to the master machine alone ensures that the slave machines can also utilize the data.

SUMMARY OF THE INVENTION

An electronic cash register system according to the present invention, comprises an electronic cash register which acts as a master machine and a plurality of electronic cash registers which act as slave machines and which transfer data to and from the master machine. The master machine includes processing means for processing of a variety of data, reading means for reading written character or graphic data, storage means for storing data read by the reading means, panel display means for displaying the contents of data stored by the storage means, control means for controlling the panel display means, and transfer means for transferring the read data to the slave machines. The slave machines include storage means for storing the data transferred from the master machine, panel display means for displaying the content of the data stored by the storage means, and control means for controlling the panel display means.

In the electronic cash register system, according to the present invention, character and graphic data which are read by the master machine alone can be transferred within the master machine and sent to all of the slave machines connected to the master machine. As a result, the workload necessitated by the input of graphic data, etc., can be significantly reduced. Furthermore, the data can be displayed by a large-size display which is provided separately from the electronic cash registers so that the display can be clearly seen by customers. Furthermore, a plurality of different data items can be displayed for predetermined times, so that a better service can be provided.

DETAILED DESCRIPTION OF PREFERRED EMBODIMENTS

The electronic cash registers according to the present invention, are basically realized by a master machine and a plurality of slave machines, and, in a large-scale system, a host computer is connected to the master machine.

A known type of electronic cash register can be employed as the electronic cash registers acting as the master machine and slave machines. Such an electronic cash register generally has, for example, key input means for inputting prices, display means for displaying the input prices, printing means for printing the prices onto paper, and storage means for storing money. A bar-code reader of either a hand-scanner type or stationary type may also be provided for the electronic cash registers.

The master machine and slve machines in the electronic cash register system according to the present invention are characterized in that each means described above is provided.

Referring to the accompanying drawings, the invention will now be described in detail.

Figure 1:
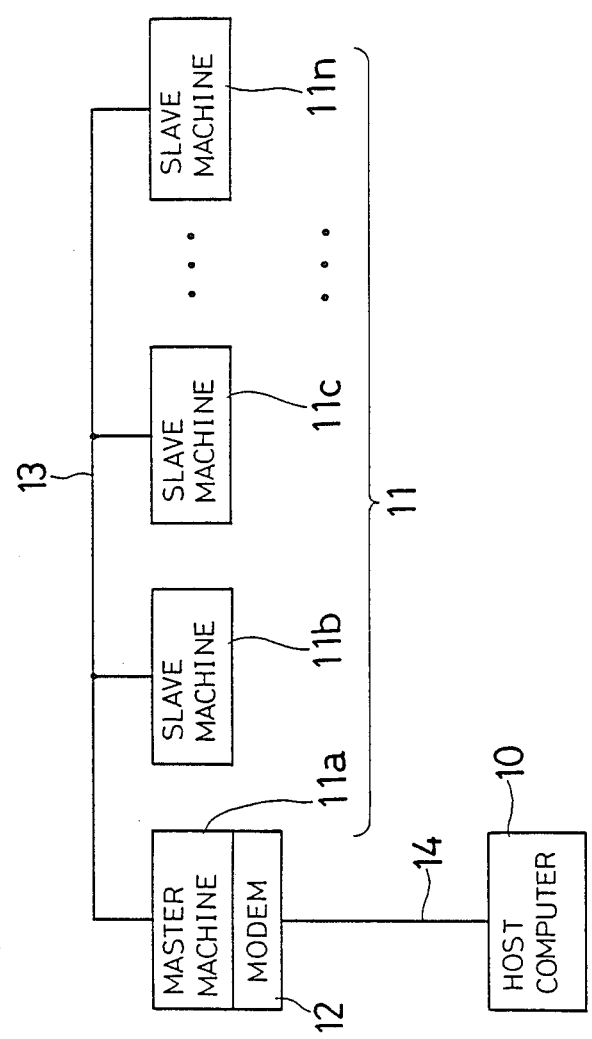
FIG. 1 is a block diagram of the structure of an embodiment of an electronic cash register system according to the present invention.

FIG. 1 is a block diagram of the structure of an embodiment of the electronic cash register system according to the present invention. The system for registration of cash has a host computer 10 and a plurality of electronic cash registers 11. The group of electronic cash registers 11 comprises a plurality of slave machines 11b, 11c, ..., 11n and a master machine 11a. This system, as described above, is, for example, installed on each floor of a department store. The master machine 11a has a modem 12, so that it can transfer data to the host computer 10 over a communication circuit 14. The master machine 11a and the slave machines 11b, ... 11n are connected in common by a transfer cable 13. In the master machine 11a, data relating to the name of an article, its price, and the department in which the article is categorized is previously inputted, for example. The remaining slave machines 11b ..., 11n, to which no data is inputted, refer the data inputted to the master machine 11a over the transfer cable 13 when the data is needed so as to perform an auxiliary role in executing the registration of cash.

Figure 2:
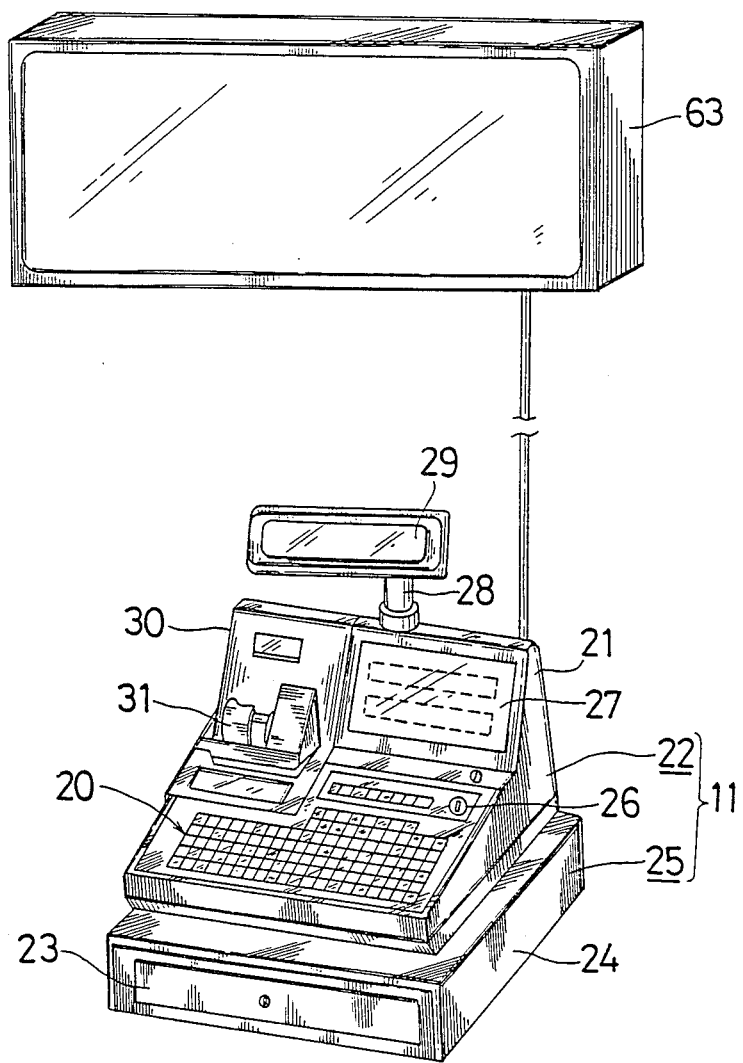
FIG. 2 is a perspective view of an electronic cash register of the embodiment.

FIG. 2 is a perspective view of the electronic cash register (ECR) 11.

The electronic cash register 11 has a main register body 22 with a housing 21 in which key input means 20 is disposed on the upper surface thereof and a cash storage portion 25 having a housing 24 which contains a drawer 23 in which cash is stored. A mode switch 26 is disposed adjacent to the key input means 20 of the main register body 22, to switch the operating mode of the electronic cash register 11.

Information which has been inputted by operating the key input means 20 is displayed on the display panel 27. Display means 29 is provided on a mounting leg 28 of the main register body 22, for the purpose of communicating information to the customer. This information which has been inputted by the key input means 20 is printed by a printer 30 onto a chit 31. A large-size display portion 63 displays image information which is read by reading means 59 formed by a hand-scanner or stationary image reader which is connected to the electronic cash register 11. A dot-matrix liquid-crystal display device or a CRT is preferably employed as the large-size display portion 63.

Figure 3A:
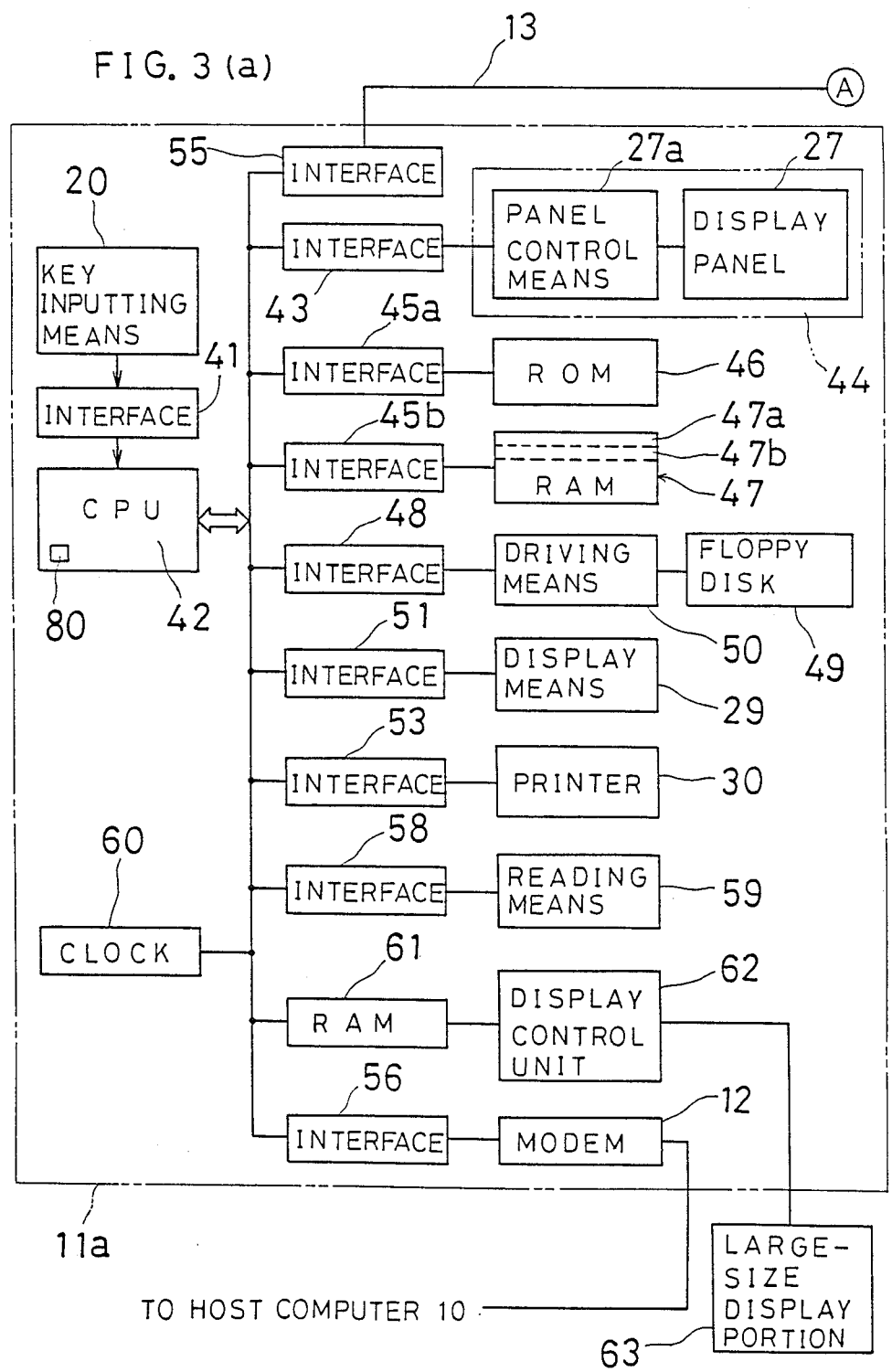
FIGS. 3 (a) and 3 (b) are block diagrams respectively illustrating the electrical structures ot the master machine and the slave machines of the electronic cash register.
Figure 3B:
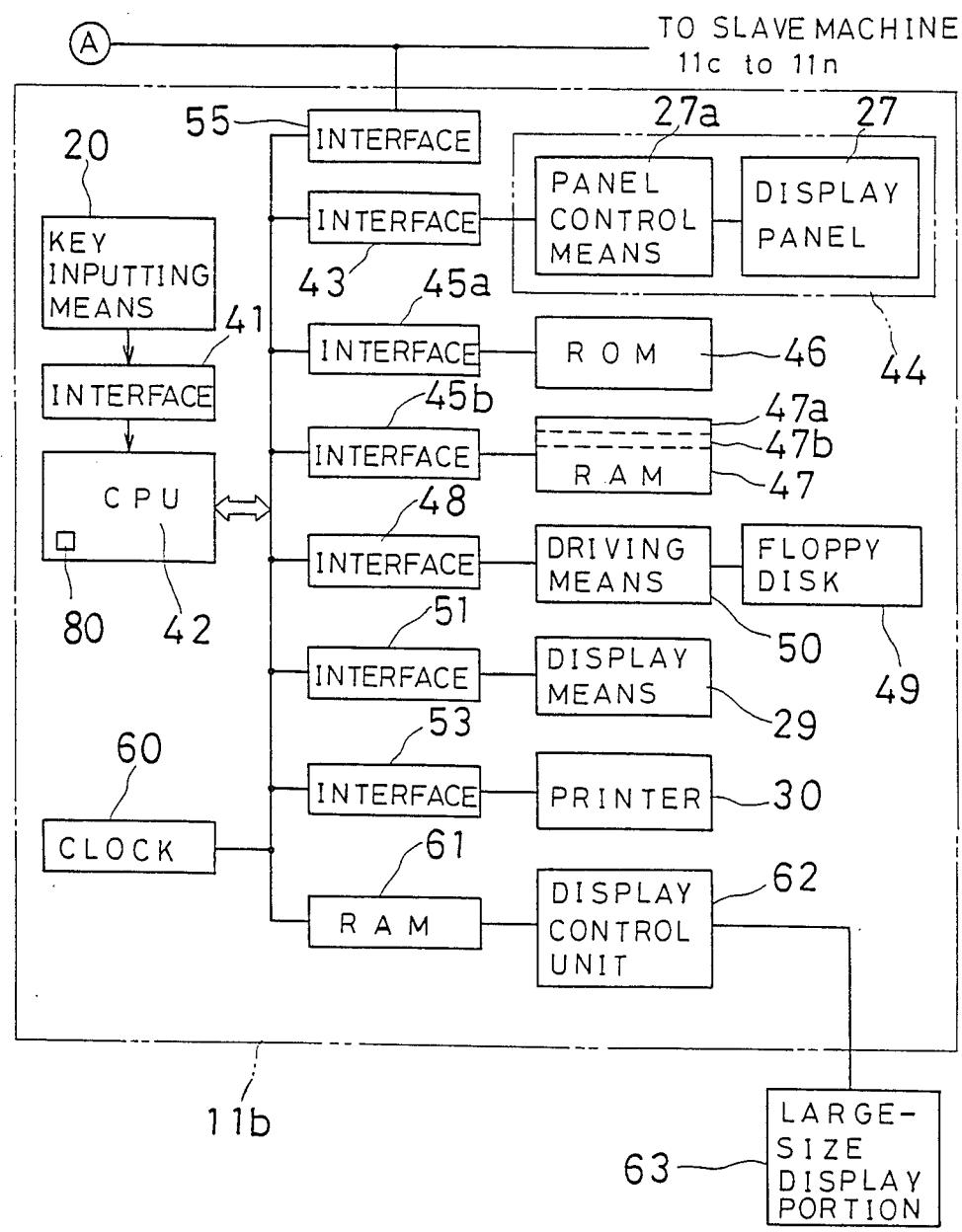

FIGS. 3 (a) and 3 (b) are block diagrams of the electrical structure of the master machine 11a and the slave machines 11b, respectively. The portions used in common by the master machine 11a and slave machines 11b are given the same numbers. The key input means 20 of the master machine 11a, having input keys for inputting data. and functions and instructio keys for displaying functions, is connected to a central processing unit (CPU) 42 realized by a large-scale integrated circuit (LSI) or the like, through an interface 41. Panel display means 44 is connected to the CPU 42 through an interface 43. A read-only-memory (ROM) 46 in which system programs are stored is connected thereto through an interface 45a. A random-access memory (RAM) 47 which stores input data is connected thereto through an interface 45b. Driving means 50 which drives storage means, that is, a floppy disk 49, is connected thereto through an interface 48. Display means 29 which displays data inputted by the input means 20 is connected thereto through an interface 51. A printer 30 which prints data which has been processed by the CPU 42 is connected thereto through an interface 53. Reading means 59 is connected thereto through an interface 58. A large-size display portion 63 which displays information read by the read means 59 in an enlarged manner and a clock 60 and connected to the CPU. The panel display means 44 is constituted by a display panel 28 and display panel control means 27a. A display control unit 62 and a random-access memory (RAM) 61 which stores information read by the reading means 59 are connected to the large-size display portion 63.

The CPU 42 is connected to the transfer cable 13 through an interface 55. A modem 12 is connected to the CPU 42 through an interface 56. In the slave machines 11b, 11c, . . . , 11n, the interfaces 56 and 58, modem 12, and reading means 59 are omitted, but the remaining parts are the same as those of the master machine 11a.

Data transferred from the slave machines 11b to 11n to the master machine 11a is stored in a transferred data storage region 47a of the random-access memory 47 of the master machine 11a by the starting up of the slave machines 11b to 11n. The master machine 11a reads the data, modulates it by the modem 12 thereof, and transfers it to the central processing unit 10.

Figure 4:
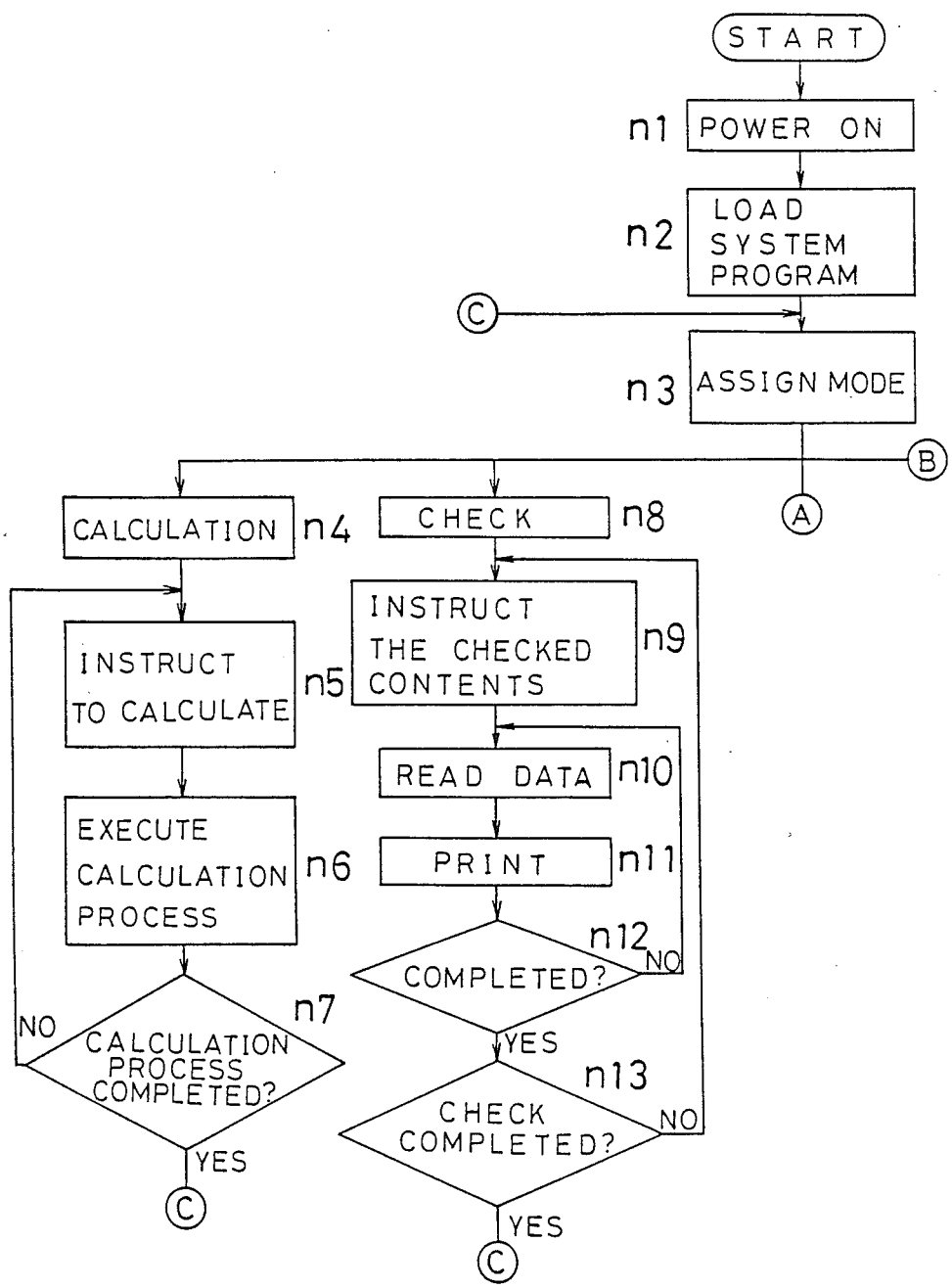
FIGS. 4(a), 4(b) and 4(c) are flowcharts of the processing of an electronic cash register.
Figure 4:
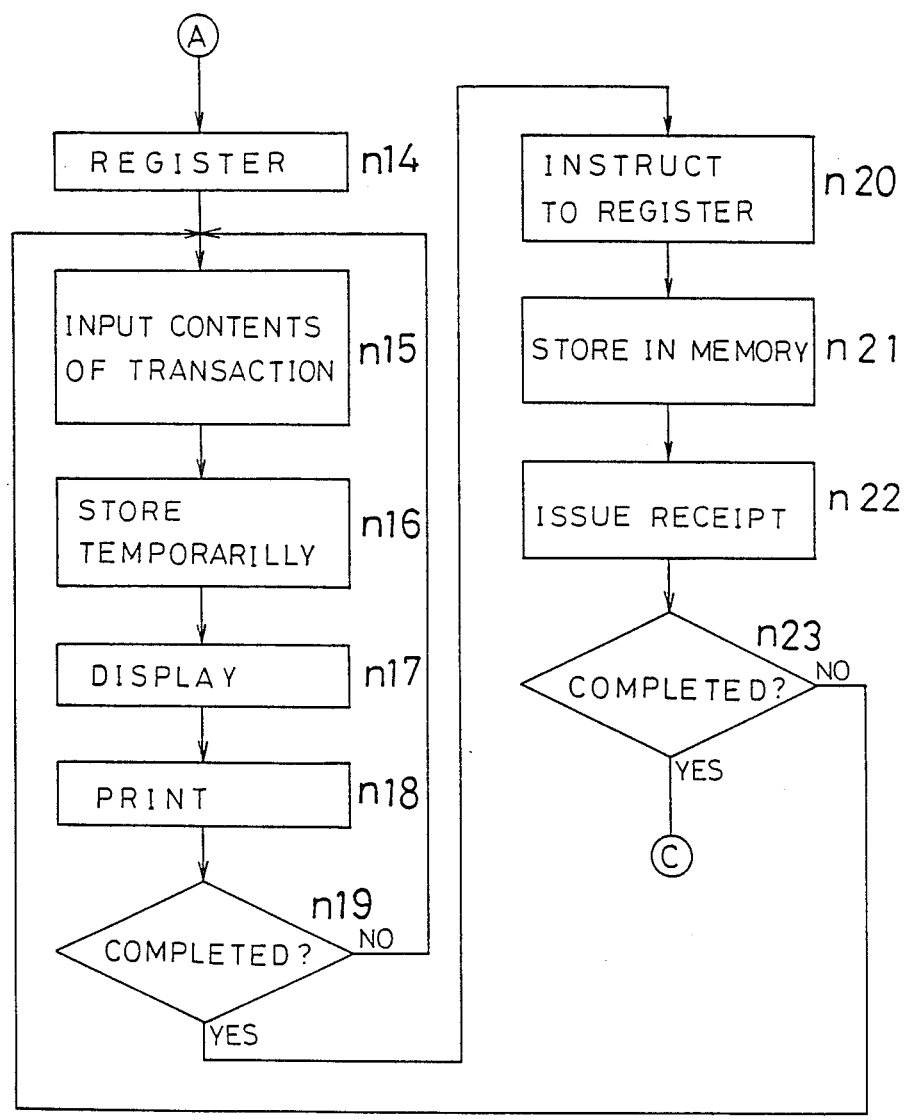

FIGS. 4(a), 4(b) and 4(c) are flowcharts of the processing of the master machine 11a. Power is turned on in step n1. The system program stored in memory 46 is read by the CPU 42 in step n2. A mode is specified by a mode switch 26 in step n3. For examle, this mode could be a calculation mode, a checking mode, a cash register mode, a read mode using reading means, a panel display mode, or a data transfer mode.

For example, if calculation mode is specified in step n3, the flow moves to step n4 in which the calculation mode is realized. In step n5, if a calculation key provided on the key input means 20 is pressed to instructed a calculation process, the calculation process is executed at step n6. At step n7, the system determines whether the calculation has been completed. If the calculation has not been completed, the process then returns to step n5. If the calculation has been completed, the flow returns to step n3.

If checking mode is specified in n3, the process moves to the checking mode at step n8, and details of the check are instructed via the key input means 20 at step n9. The data to be checked is read at step n10. Data to be printed is printed by the printer 30 at step n11. At step n2 it is determined whether the printing has been completed. If the printing has not been completed, the process returns to step n10. If the printing has been completed, it is determined whether the checking has been completed at step n13. If the checking has not been completed, the process returns to step n9. If the checking has been completed, the process returns to step n3.

If register mode is specified in step n3, the process moves to step n14 in which the register mode is realized. The transaction details are input by means of the key input means 20 at step n15. These details are temporarily stored in a buffer 80 (see FIG. 3) at the CPU 42 in step n16. The data is displayed on the display means 29 at step n17, and the data is printed by the printer 30 at step n18. At step n19, it is determined whether printing has been completed. If the printing has not been completed, the process returns to step n15. If the printing has been completed, the process shifts to step n20 in which a registration execution key, which is provided for the key input means 20, is operated. The details are then stored in a memory region 46b (see FIG. 3) of the random-access memory 47 at step n21. The registers details are also printed by the printer 30 onto the chit 31 at step n22. Whether the transaction has been completed is determined at step n23. If the registration has not been completed, the process returns to step n15. If the registration has been completed, the process returns to step n3.

Figure 6:
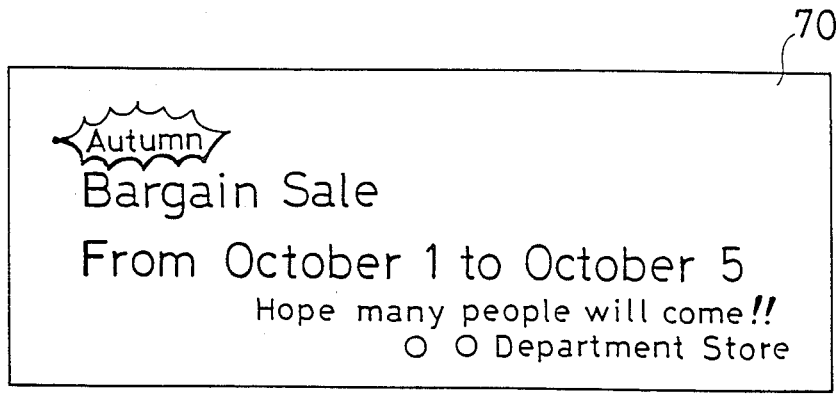
FIG. 6 is a view illustrating the contents of a sheet of paper to be read.

If read mode using reading means 59 is specified in step n3, the read mode is realized at step n24. For example, assume that character or graphic data is to be displayed as image information from a sheet of paper 70 as shown in FIG. 6. An operator determines which of the plurality of connected slave machines 11b to 11n is to display the image information such as characters recorded on the paper 70, and inputs this decision by the key input means 20 (step n25). Then, at step n26, the operator determines the time at which the image information recorded on the paper 70 is to be displayed, and inputs it. For example, assume that the display is to start at 13:00 and end at 15:00, on the slave machines 11c and 11e. Information specifying the slave machines 11c and 11e and the timing of the display are inputted by the key input means 20. The information is transferred to the CPU 42 through the interface 41, and the driving means 50 is actuated through an interface 48. The data is then stored on the floppy disk 49 (step n27), and as a result, the floppy disk 49 is put in a state in which it waits for the input of the image data. At step n28, scanning by the reading means 59 is performed to read the image information recorded on the paper 70. At step n29, the image information is read, and the driving means 50 is again actuated through the interfaces 58 and 48. As a result, the image information and the information relating to the specification of the slave machines 11c and 11e are stored on the waiting floppy disk 49. At step n30, whether there is more data exists is determined. If there is more data, the process shifts to step n25. If there is no more data, the process returns to step n3.

When information stored on the floppy disk 49 is to be displayed on the display panel 27, the operator switches the mode to panel display mode at step n3. As a result of this switching, the panel display mode is realized at step n31. Then, a panel display instruction key, which is provided for by the key input means 20, is pressed at step n32. As a result of this pressing, the data stored on the floppy disk 49 is sequentially read through the interface 48 and is sent to panel display control means 44 through the interface 43. Consequently, the character information shown in FIG. 6 or the like is displayed on the display panel 27 as image information at step n33.

Then a panel display retaining key, which is provided for the input means 20, is pressed at step n32. As a result, information such as the characters shown in FIG. 6, which has been displayed on the display panel 27 can be retained as it is. At step n35, whether the panel display processing has been completed is determined. If the processing has not been completed, the process returns to step n32, wherein other display information is displayed. If the panel display processing has been completed in step n33, the process returns to step n3.

If data transfer mode is specified in step n3, the transfer mode is realized at step n36. Data read by the reading means 59 and data such as specification information are read at step n37. The read data contains data indicating whether the data is to be transferred within the master machine 11a or whether it is to be sent to one of the slave machines 11b to 11n. The data transfer is instructed by pressing a transfer key which is omitted from the illustration of the key input means 20 (step n38). The transfer is executed at step n39, and the data is stored in the RAM 61 of the specified machine. If the determination that more data is to be transferred at step n40, the process returns to step n37, but if the transfer has been completed, the process returns to step n3.

Figure 5:
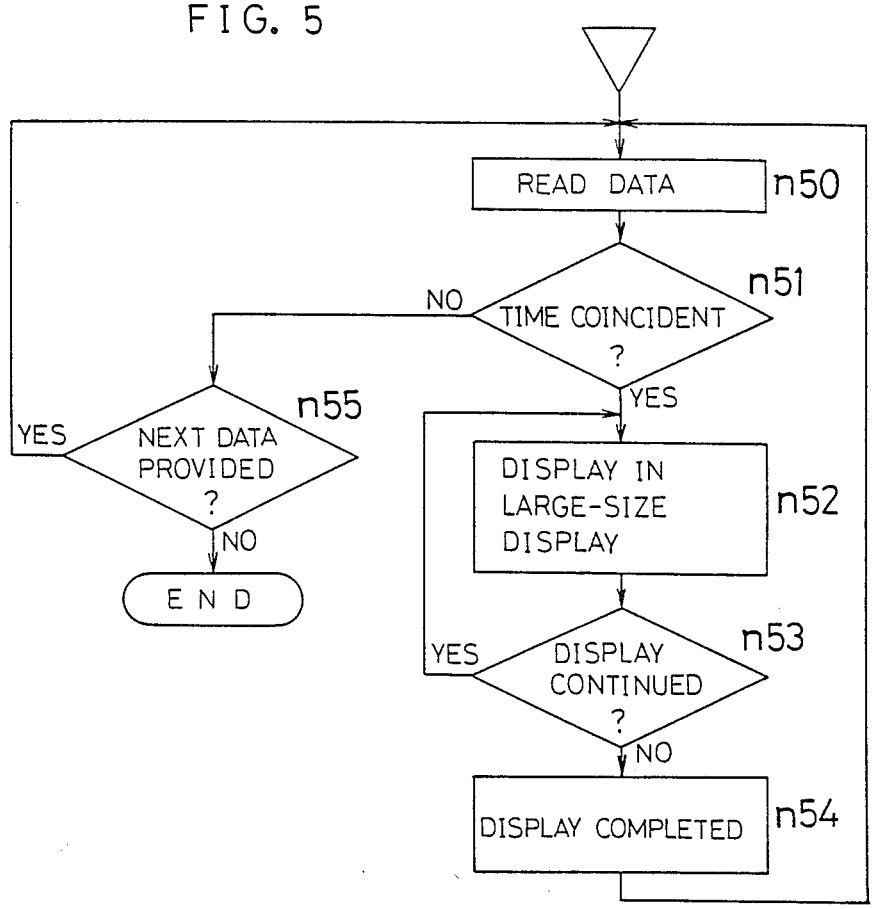
FIG. 5 is a flowchart of the processing for displaying data stored in the master machine and the slave machines.

FIG. 5 is a flowchart of processing the data at a specific machine by which image data that has been transferred within the master machine 11a or sent to a specified slave machines in a time sharing manner and is temporarily stored, This image data is displayed on the large-size display portion 63 at the specific slave machine or master machine. Data stored in the RAM 61 of the specific electronic cash register is read at step n50. The time which has been stored with the data, that is, the time at which the data is to be displayed is compared with the current time of the clock 60 at step n51. If they coincide with each other, the large-size display portion 63 displays the data (step n52). If the times do not coincide, the process moves to step n55, then the process returns to step n50 if there is more data to be read, or if there is no more data, the processing ends. The data displayed on the large-size display portion 63 is displayed continuously for a predetermined time (step n53), and the display ends after the predetermined time has elapsed (step n54). The flow then returns to step n50, and the next data is read.

Although data which has been read by the reading means is displayed on the large-size display portion in the aforementioned embodiment, the data may be printed on a receipt to be handed to the customer.

What is claimed is:

1. An electronic cash register system for transferring data comprising:
   an electronic cash register acting as a master machine; and
   a plurality of electronic registers acting as slave machines;
   said master machine including,
      processing means for processing a variety of data,
      reading means, operatively connected to said processing means, for reading written character or graphic data,
      first storage means, operatively connected to said reading means, for storing data read by said reading means,
      first panel display means, operatively connected to said first storage means, for displaying the data stored by said first storage means,
      first control means, operatively connected to said processing means, for controlling said first panel display means, and
      transfer means, operatively connected to said processing means, for transferring the read data to said slave machines; each slave machine including,
      second storage means for storing data transferred from said master machine,
      second panel display means, operatively connected to said second storage means, for displaying the data stored by said second storage means, and
      second control means, operatively connected to said second panel display means, for controlling said second panel display means.

2. The electronic cash register system as claimed in claim 1, wherein said master machine and each of said slave machines further includes large-size display means for displaying the data, which is displayed on said first and second panel display means, in an enlarged manner.

3. The electronic cash register system as claimed in claim 2, wherein said large-size display means is a dot-matrix liquid-crystal display device.

4. The electronic cash register system as claimed in claim 2, wherein said large-size display means is a CRT.

5. The electronic cash register system as claimed in claim 1, wherein said reading means is a hand-scanner type of image reader.

6. The electronic cash register system as claimed in claim 1, wherein said reading means is a stationary image reader.

* * * * *